(12) United States Patent
Dahle et al.

(10) Patent No.: US 11,700,971 B2
(45) Date of Patent: *Jul. 18, 2023

(54) OUTDOOR COOKING STATION WITH MULTIPLE INDEPENDENT COOKING MODES AND METHOD THEREOF

(71) Applicant: North Atlantic Imports, LLC, Logan, UT (US)

(72) Inventors: Roger Dahle, Providence, UT (US); Steve L. Puertas, Wellsville, UT (US); Jeffrey D. Clark, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,704

(22) Filed: Aug. 20, 2021

(65) Prior Publication Data

US 2022/0039596 A1 Feb. 10, 2022

Related U.S. Application Data

(63) Continuation of application No. 16/428,605, filed on May 31, 2019, now Pat. No. 11,116,360.

(60) Provisional application No. 62/678,436, filed on May 31, 2018.

(51) Int. Cl.
*A47J 37/07* (2006.01)
*A23L 5/10* (2016.01)
*A47J 37/06* (2006.01)
*A23B 4/052* (2006.01)

(52) U.S. Cl.
CPC ........... *A47J 37/0713* (2013.01); *A23B 4/052* (2013.01); *A23L 5/15* (2016.08); *A47J 37/0682* (2013.01); *A47J 37/0709* (2013.01); *A23V 2002/00* (2013.01)

(58) Field of Classification Search
CPC ............... A47J 37/0713; A47J 37/0682; A47J 37/0709; A23L 5/15; A23B 4/052; A23V 2002/00
See application file for complete search history.

(56) References Cited

U.S. PATENT DOCUMENTS

| | | |
|---|---|---|
| 2,708,925 A | 5/1955 | Cordrey |
| 3,763,846 A | 10/1973 | Schantz |
| 3,789,822 A | 2/1974 | Schantz |
| 4,321,857 A | 3/1982 | Best |
| 4,757,755 A | 7/1988 | Sarten |

(Continued)

*Primary Examiner* — Steven N Leff
(74) *Attorney, Agent, or Firm* — David L. Stott

(57) ABSTRACT

An outdoor cooking station configured to simultaneously and independently cook food with separate cooking modes. The cooking station includes a main body defining separate first and second cooking portions fueled by separate fuel sources for cooking food in the separate modes. The first cooking portion includes gas-fueled first heating elements configured to heat a first cooking surface associated with the first cooking portion of the main body. The second cooking portion of the main body extends to define a chamber, the chamber being accessible with a door or hood pivotably coupled to the main body. The chamber includes an upper region and a lower region separated by an inner panel, the upper region including a second cooking surface suspended within the upper region. The lower region includes a second heating element sized and configured to electrically heat pellet elements to supply heat and smoke to the upper region.

24 Claims, 4 Drawing Sheets

(56) References Cited

U.S. PATENT DOCUMENTS

| | | |
|---|---|---|
| 4,823,684 A | 4/1989 | Traeger et al. |
| 4,905,664 A | 3/1990 | Dunham |
| 5,183,028 A | 2/1993 | Traeger et al. |
| 5,189,945 A | 3/1993 | Hennick |
| 5,251,607 A | 10/1993 | Traeger et al. |
| 5,711,209 A | 1/1998 | Guines |
| 5,719,377 A | 2/1998 | Giebel et al. |
| 5,765,543 A | 6/1998 | Hopkins |
| 5,839,361 A | 11/1998 | Richter |
| 6,189,528 B1 | 2/2001 | Oliver |
| 6,324,998 B1 | 12/2001 | Alden et al. |
| 6,640,800 B1 | 11/2003 | Hodgson et al. |
| 6,820,538 B2 | 11/2004 | Roescher |
| 6,874,496 B2 | 4/2005 | Waits et al. |
| 6,935,327 B1 | 8/2005 | Williams et al. |
| D577,945 S | 10/2008 | Traeger et al. |
| 7,517,371 B2 | 4/2009 | Traeger et al. |
| 7,900,553 B1 | 3/2011 | Maurin |
| 7,959,692 B1 | 6/2011 | Traeger et al. |
| 8,328,884 B1 | 12/2012 | Traeger et al. |
| D708,001 S | 7/2014 | Measom et al. |
| D724,714 S | 3/2015 | Benson et al. |
| D760,539 S | 7/2016 | Colston |
| 9,635,978 B2 | 5/2017 | Measom et al. |
| 9,709,281 B2 | 7/2017 | Ahmed |
| 9,788,688 B1 | 10/2017 | Ficarra |
| 9,814,354 B2 | 11/2017 | McAdams et al. |
| 9,930,991 B2 | 4/2018 | Traeger |
| D817,091 S | 5/2018 | Colston |
| D825,990 S | 8/2018 | Colston et al. |
| D827,368 S | 9/2018 | Colston |
| D827,370 S | 9/2018 | Colston |
| D829,035 S | 9/2018 | Measom et al. |
| D829,049 S | 9/2018 | Measom et al. |
| D829,050 S | 9/2018 | Measom et al. |
| D829,499 S | 10/2018 | Colston |
| 10,105,007 B2 | 10/2018 | Colston et al. |
| 2006/0081236 A1 | 4/2006 | Johnston et al. |
| 2007/0137634 A1 | 6/2007 | Traeger et al. |
| 2008/0236564 A1 | 10/2008 | Burtea et al. |
| 2011/0219958 A1 | 9/2011 | Noble |
| 2011/0271949 A1 | 11/2011 | Ortner et al. |
| 2015/0144238 A1 | 5/2015 | Traeger |
| 2017/0065124 A1 | 3/2017 | Colston |
| 2017/0067649 A1 | 3/2017 | Colston |

OUTDOOR COOKING STATION WITH MULTIPLE INDEPENDENT COOKING MODES AND METHOD THEREOF

CROSS-REFERENCE TO RELATED APPLICATIONS

This application is a continuation of U.S. patent application Ser. No. 16/428,605, filed May 31, 2019, which claims the benefit of U.S. Provisional Application No. 62/678,436, filed May 31, 2018, the disclosures of which are hereby incorporated by reference herein in their entirety.

TECHNICAL FIELD

The present invention relates generally to outdoor type cooking stations and, more specifically, the present invention relates to independent cooking modes within a single stand-alone outdoor cooking station.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. As such, grilling has become a popular method of cooking food due to the unique flavors and texture imparted to the food during the grilling process.

Another form of grilling that imparts unique flavors and texture to food is by employing a griddle. The griddle is a cooking device consisting of a broad flat surface that can be heated over, for example, a gas fueled open flame and is used in both residential and commercial applications. The griddle is most commonly a flat metal plate composed of cast or wrought iron, aluminum or carbon steel.

Further, another mode of grilling that imparts unique flavors to food is grilling with a smoker device. The smoker device uses pellets as a fuel source and, as the pellets are burned, the pellets provide heated smoke to a substantially enclosed chamber to impart flavor to the food through the cooking process. Those desiring to cook food with a smoker device and a griddle or grilling barbeque station are often limited by the space available on their back patio or deck and, therefore, will likely only choose one or the other type of cooking stations in order to enjoy barbequing their food.

BRIEF SUMMARY OF THE INVENTION

The present invention is directed to various embodiments of an outdoor cooking station configured to simultaneously and independently cook food with separate cooking modes, one of the cooking modes configured to burn pellet elements to produce heat and smoke. In one embodiment, the outdoor cooking station includes a main body extending to define an upper cooking portion and a lower cooking portion for cooking in the separate cooking modes. The upper cooking portion includes first heating elements extending below an upper edge of the main body, the first heating elements configured to heat a first cooking surface associated with the upper cooking portion of the main body. The lower cooking portion of the main body extends to define a chamber, the chamber being accessible with a door pivotably coupled to the main body. The chamber includes an upper region and a lower region separated by an inner panel, the upper region including a second cooking surface suspended within the upper region. The lower region includes a second heating element sized and configured to electrically heat the pellet elements to supply heat and smoke to the upper chamber region.

In another embodiment, the first cooking surface extends to define a griddle member, the griddle member positionable over the upper edge of the main body. In another embodiment, the main body extends vertically to define a central axis extending centrally and vertically through the main body, the central axis extending through the first cooking surface and the second cooking surface. In still another embodiment, the first heating elements are sized and configured to burn gas fuel.

In another embodiment, the main body defines a smoke outlet in a vertically extending panel of the main body that at least partially surrounds the chamber. In another embodiment, the inner panel defines a smoke opening therein, the inner panel being removable from the chamber. In still another embodiment, the second cooking surface is removable from the chamber. In another embodiment, the second cooking surface extends to define a rack, the rack extending substantially parallel relative to the first cooking surface.

In another embodiment, the outdoor cooking station further includes a pellet feeder system for feeding the pellet elements adjacent the second heating element in the lower region of the chamber, the pellet feeder system coupled to the main body. In another embodiment, the outdoor cooking station further includes a temperature sensor and a controller, the temperature sensor associated with the chamber and configured to sense a temperature of the chamber, the controller operably coupled to the temperature sensor and the pellet feeder system and configured to control an amount of the pellet elements being fed to the second heating element to control the temperature of the chamber.

In another embodiment, the main body extends with frame components and panels each extending to define the upper cooking portion and the lower cooking portion between the upper edge and a bottom end of the main body, the panels extending to define the chamber directly below the first heating elements. In another embodiment, the main body extends vertically between the upper edge and a bottom end of the main body, the bottom end including wheels extending adjacent therefrom to facilitate portability of the main body. In still another embodiment, the main body includes a first side shelf and a second side shelf coupled thereto. In a further embodiment, one of the first side shelf and the second side shelf extends over a pellet feeder system coupled to the main body, the pellet feeder system configured to feed the pellet elements into the lower region of the chamber defined in the main body.

In accordance with another embodiment of the present invention, a method for cooking food in the outdoors is provided. The method incudes the steps of: providing an outdoor cooking station with a main body extending to define an upper cooking portion and a lower cooking portion, the upper cooking portion including first heating elements for heating a first cooking surface positioned adjacent an upper edge of the main body, the lower cooking portion defining a chamber configured to hold heat therein and accessible with a door pivotably coupled to the main body, the lower cooking portion separated by a removable inner panel to define an upper region and a lower region of the chamber; opening the door to position food on a second cooking surface suspended within the upper region of the lower cooking portion and then closing the door to enclose the food within the chamber of the lower cooking portion; heating the chamber with an electrical heating element positioned in the lower region for burning pellet elements to generate smoke so that heated smoke moves from the lower region and through a smoke opening to fill the upper region to heat the food on the second cooking surface; and heating the first cooking surface with the first heating elements for cooking other food on the first cooking surface simultaneously while cooking food on the second cooking surface.

In another embodiment, the method step of providing includes providing the first cooking surface to define a griddle member positionable on the upper edge of the main body above the first heating elements such that the first cooking surface, in a use state, is substantially parallel relative to the second cooking surface. In another embodiment, the method step of heating the chamber includes feeding the pellet elements to a pellet cup in the lower region with a pellet feeder system positioned adjacent the main body of the cooking station and extending partially within the lower region such that the second heating element extends into a bottom portion of the pellet cup. In another embodiment, the method step of feeding the pellet elements to the pellet cup includes controlling the amount of pellets for feeding to the second heating element with a controller and heat sensor, the heat sensor associated with the chamber of the lower cooking portion.

In accordance with another embodiment of the present invention, an outdoor cooking station configured to simultaneously and independently cook food with separate cooking modes and with separate fuel sources is provided, in which one of the cooking modes is configured to burn pellet elements to produce heat and smoke. The outdoor cooking station includes a main body extending to define a first cooking portion and a second cooking portion for cooking in the separate cooking modes. The first cooking portion includes first heating elements extending below an upper edge of the main body. The first heating elements are configured to heat a first cooking surface associated with the first cooking portion of the main body. The second cooking portion of the main body extends to define a smoker chamber, the smoker chamber being accessible with a pivoting lid coupled to the main body. The smoker chamber includes an upper smoker region and a lower smoker region separated by an inner panel. The upper smoker region includes a second cooking surface suspended within the upper smoker region. The lower smoker region includes a second heating element that is sized and configured to electrically heat the pellet elements to supply the heat and the smoke to the upper smoker region.

In another embodiment, the first cooking surface extends to define a griddle member, the griddle member positionable over the upper edge of the main body. In another embodiment, the first and second cooking portions are supported by the main body in a side-by-side arrangement. In another embodiment, the first heating elements are sized and configured to burn gas fuel.

In another embodiment, the upper chamber region of the second cooking portion defines a smoke outlet therein, the smoke outlet moveable to various positions to vary the smoke and heat escaping the upper chamber region. In another embodiment, the inner panel defines a smoke opening therein, the inner panel being removable from the smoker chamber. In another embodiment, the second cooking surface is removable from the smoker chamber. In another embodiment, the second cooking surface extends to define a rack, the rack extending substantially level relative to the first cooking surface.

In another embodiment, the outdoor cooking station includes a pellet feeder system for feeding the pellet elements adjacent the second heating element in the lower smoker region of the smoker chamber, the pellet feeder system coupled to the main body. In a further embodiment, the pellet feeder system includes a temperature sensor and a controller, the temperature sensor associated with the smoker chamber and configured to sense a temperature of the smoker chamber, the controller operably coupled to the temperature sensor and the pellet feeder system and configured to control an amount of the pellet elements being fed to the second heating element to control the temperature of the smoker chamber.

In another embodiment, the main body extends with frame components and panels each extending to define the first cooking portion and the second cooking portion, the panels extending to define the smoker chamber adjacently along one side of the first cooking portion. In another embodiment, the main body includes legs and wheels, the wheels configured to facilitate portability of the main body. In another embodiment, the main body extends between opposite first and second sides, the first side extending to define a side shelf and the second side having a pellet feeder system coupled thereto. In a further embodiment, the pellet feeder system is configured to feed the pellet elements into the lower smoker region of the smoker chamber so that the second heating element creates the heat and the smoke to the smoker chamber.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
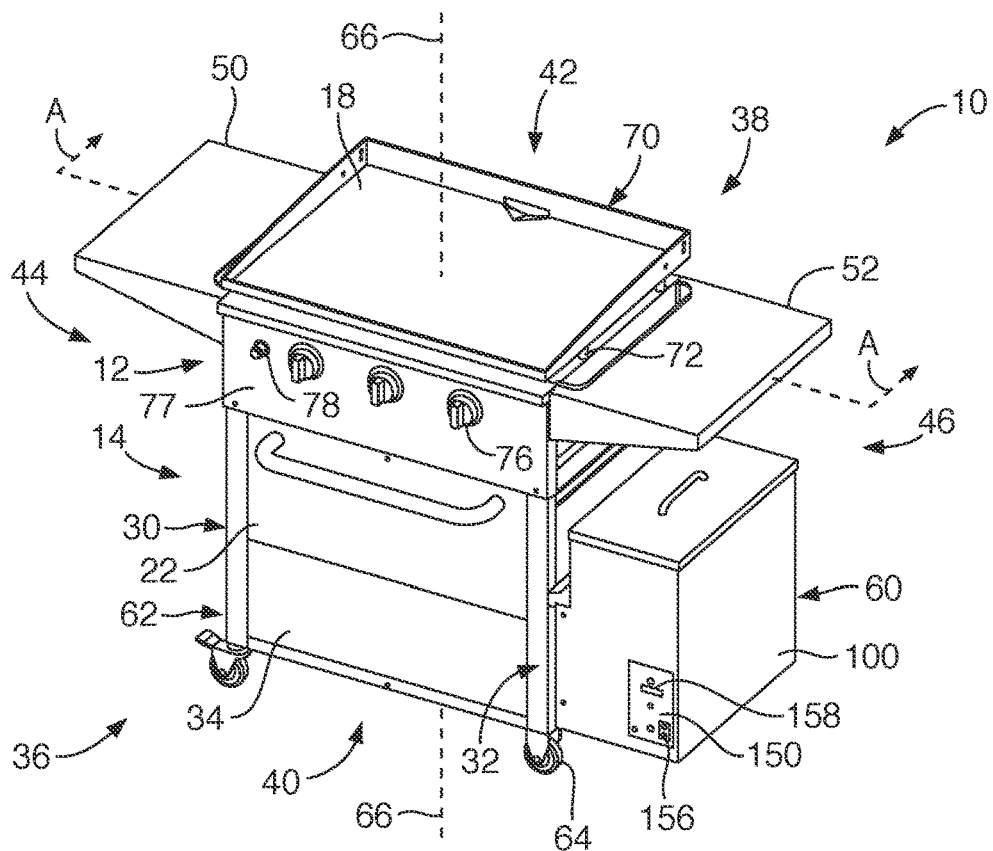
FIG. 1 is a perspective view of a cooking station having both a griddle cooking portion and a smoker cooking portion, according to an embodiment of the present invention.
Figure 2:
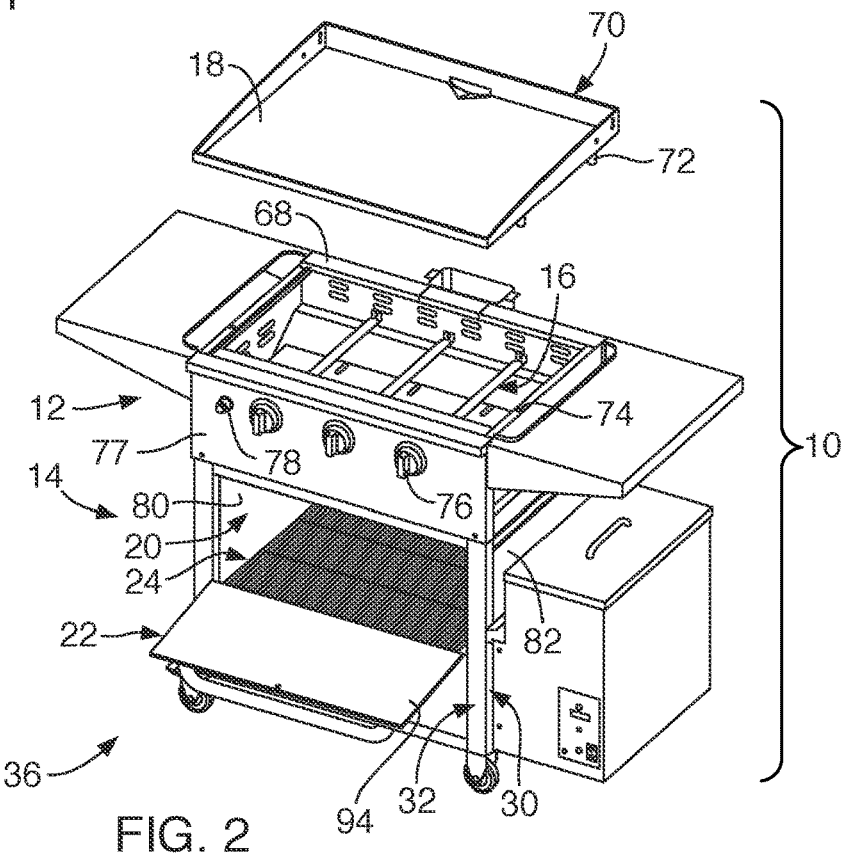
FIG. 2 is a partially exploded perspective view of the cooking station of FIG. 1, depicting heating elements for the griddle cooking portion and a door of a smoker chamber in an open position, according to another embodiment of the present invention.
Figure 3:
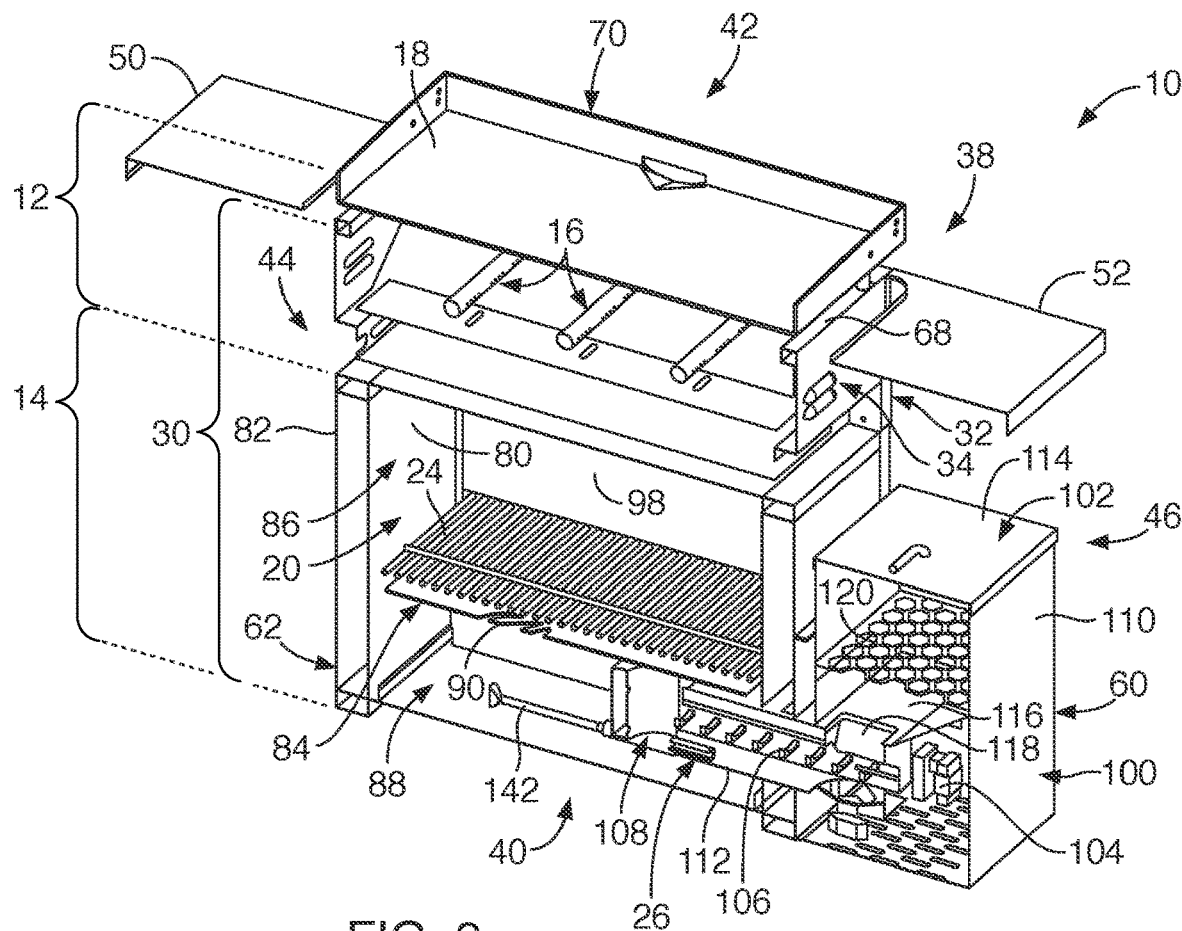
FIG. 3 is a cross-sectional perspective view of the cooking station taken along section line A-A of FIG. 1, according to another embodiment of the present invention.

Referring to FIGS. 1 and 2, one embodiment of a cooking station 10 sized and configured to cook food with separate and independent cooking modalities or modes is provided. The cooking station 10 may be an outdoor type cooking station. Further, the cooking station 10 may include structural characteristics that facilitate portability of the cooking station 10. The cooking station 10 may include an upper cooking portion 12 and a lower cooking portion 14 such that each cooking portion is separate and independent from the other and may be employed to cook food simultaneously with the cooking station 10. The upper cooking portion 12 may include a first heating element 16 that may be gas fueled and sized and configured to heat a first cooking surface 18, such as a grill structure or griddle member. The lower cooking portion 14 may be in the form of a smoker chamber 20 accessible with a door 22, the smoker chamber 20 including a second cooking surface 24 suspended above a second heating element 26 (FIG. 3). The second heating element 26 may be sized and configured to electrically heat pellet elements (not shown) to supply heated smoke to the second cooking surface 24 within the chamber 20. In this manner, the cooking station 10 may be employed to cook food simultaneously in different cooking modes and with independent, separate, and different heat sources, each cooking mode providing a unique flavor and texture to the food being cooked. As such, the cooking station 10 provides a compact and portable outdoor cooking station that facilitates cooking food in at least two different cooking modes that traditionally would require at least two separate stand-alone cooking stations.

With reference to FIGS. 1-3, the cooking station 10 may include a main body 30 extending to define and support the upper and lower cooking portions 12, 14. The main body 30 may include frame components 32 with various panels 34 secured to the frame components 32 to define the upper and lower cooking portions 12, 14. For example, the frame components 32 may extend with vertically extending frame components and horizontally extending frame components with the panels 34 attached thereto to define a front side 36, a rear side 38, a bottom side 40, a top side 42, a first side 44 and a second side 46 of the main body 30. The front side 36 may generally face opposite relative to the rear side 38 of the main body 30. Likewise, the bottom side 40 may generally face opposite relative to the top side 42 or upper side, and the first side 44 may face generally opposite from the second side 46 of the main body 30. In this manner, the main body 30 may externally extend to define a generally box-shaped cubical structure. Further, the cooking station 10 may include a first side shelf 50 and a second side shelf 52 attached to first and second sides 44, 46 of the main body 30 such that the first and second side shelves 50, 52 may be generally level with the top side 42 of the main body 30. In another embodiment, the first and second side shelves 50, 52 may be off-set to a lower position relative to the top side 42 of the main body 30. Also, the second side 46 (or the first side 44) of the main body 30 may include a pellet feeder system 60 coupled to a lower portion 62 of the main body 30, discussed in more detail herein, such that a portion of the pellet feeder system 60 may be positioned below the second side shelf 52. Further, at the lower portion 62 of the main body 30, the main body 30 may include caster wheels 64 or the like to be coupled at an end of legs or the vertically extending frame components so as to facilitate portability of the cooking station 10. In one embodiment, the main body 30 may include four caster wheels 64. In another embodiment, the main body 30 may include two caster wheels 64. In another embodiment, the caster wheels 64 may be coupled directly to vertically extending frame components. In another embodiment, the caster wheels 64 may be coupled to horizontally extending frame components adjacent to the bottom side 40 of the main body 30.

Within the main body 30, the upper cooking portion 12 may be positioned directly above the lower cooking portion 14 such that a vertically extending central axis 66 of the main body 30 may extend centrally through the upper and lower cooking portions 12, 14 and, further, such that the central axis 66 extends centrally through the first and second cooking surfaces 16, 24. In regard to the upper cooking portion 12, the frame components 32 with the panels 34 attached thereto may define an open-ended box-like structure extending upward from the lower cooking portion 14 to an upper edge 68. The panels 34 of the upper cooking portion 12, along the rear side 38, the first side 44, and second side 46 may include venting structure defined therein.

The upper edge 68 may extend horizontally to define a rectangular periphery that may define the top side 42 of the main body 30. Such upper edge 68 may extend adjacent to the first cooking surface 18. In one embodiment, the first cooking surface 18 may be a flat surface and may extend to define a griddle member 70 such that the upper edge 68 may be sized and configured to support the griddle member 70. For example, the griddle member 70 may include griddle legs 72 that extend from a bottom surface of the griddle member 70 such that the griddle legs 72 may be sized to sit within apertures 74 defined on the first and second sides 44, 46 of the upper edge 68 of the main body 30. In another embodiment, the upper edge 68 of the main body 30 may extend adjacent to a grill member (not shown) extending between opposite sides of the upper edge 68, such as between first and second sides 44, 46 and front and rear sides 36, 38 of the upper edge 68. In still another embodiment, the upper edge 68 of the upper cooking portion 12 of the main body 30 may be sized and configured to support a pivoting hood (not shown) or the like associated with the main body 30, the hood being pivotably coupled to the rear side 38 of an upper cooking portion 12 of the main body 30, such as adjacent the rear side 38 of the upper edge 38.

Further, the front side 36 of the upper cooking portion 12 may include multiple burner control valves 76 or knobs positioned over a front panel 77. Each of the burner control valves 76 or knobs may be associated with one of the first heating elements 16 or flame burners. The first heating elements 16 may extend between the front side 36 and rear side 38 of the main body 30 below the upper edge 68 of the main body 30 such that the first heating elements 16 may be secured to the frame components 32 extending within and adjacently along the front and rear sides 36, 38 of the main body 30. Each of the first heating elements 16 may hold structure for feeding pressurized fuel therethrough, such as propane gas or natural gas, and controlled with the burner control valves 76 or knobs. In addition, the front panel 77 may include an ignitor switch 78 that may be depressed to provide a spark to ignite the gas fueled first heating elements 16. The cooking station 10 may include various typical components to facilitate igniting the first heating elements 16 and heating the first cooking surface 18 associated with the cooking station 10, such as various valves, tubing, manifold, gas couplings, fasteners, and any other components, as known to one of ordinary skill in the art. Further, the cooking station 10 may include a propane tank holder (not shown) attached to the lower portion 62 of the main body 30, such as adjacent the first side 44, second side 46, or rear side 38 of the main body 30. The propane tank holder may support a propane tank (not shown) thereon which may be coupled to the cooking station 10 via the typical components for feeding propone to the first heating elements 16, as known by one of ordinary skill in the art. With this arrangement, the cooking station 10 may be employed for heating the first cooking surface 18 for cooking food with the upper cooking portion 12 of the cooking station 10.

Figure 4:
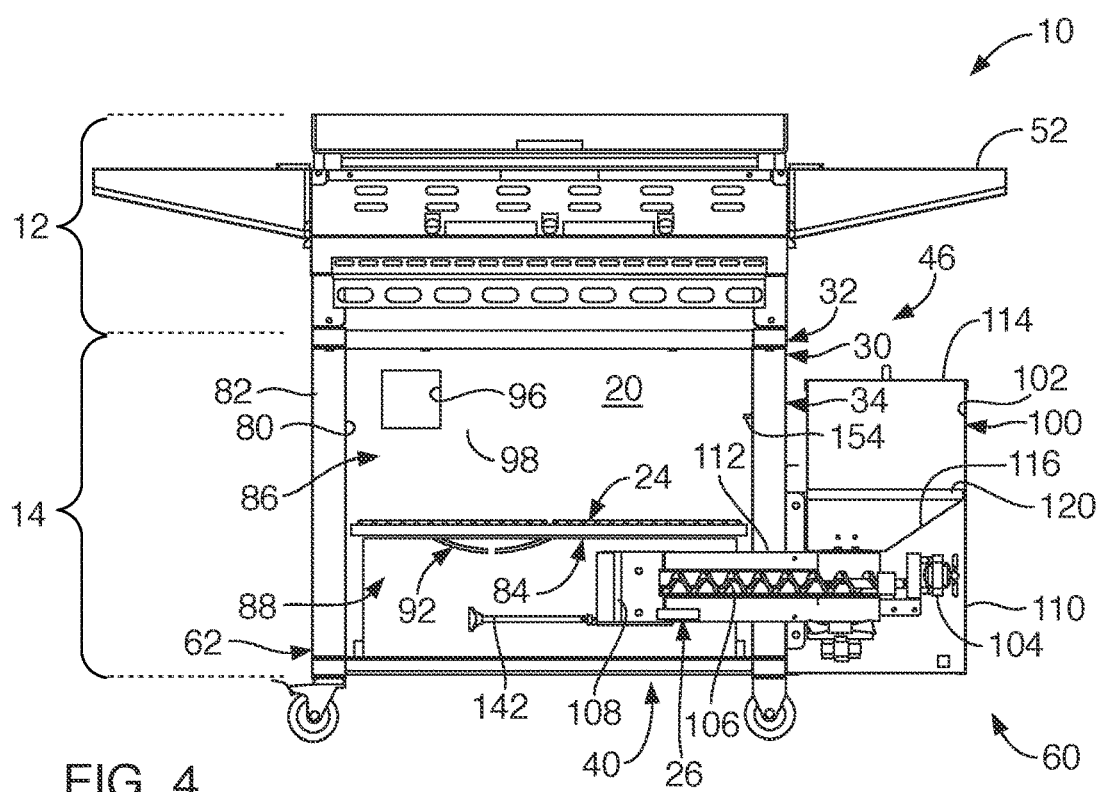
FIG. 4 is a front cross-sectional view of the cooking station taken along section line A-A of FIG. 1, according to another embodiment of the present invention.

Now with reference to FIGS. 2, 3 and 4, the lower cooking portion 14 of the main body 30 of the cooking station 10 may extend with the frame components 32 and panels 34 attached thereto so as to generally define a cubical shaped chamber, such as the before discussed smoker chamber 20. For example, some of the frame components 32 may extend vertically downward directly from the upper cooking portion 12 and some of the frame components 32 may extend horizontally below the upper cooking portion 12 and along a bottom of the lower cooking portion 14 (or bottom side 40 of the main body 30) so that the panels 34 may be coupled thereto to define walls of the lower cooking portion 14. The walls of the lower cooking portion 14 may define inner and outer panels 80, 82 extending to define the lower cooking portion 14. In one embodiment, the inner and outer panels of 80, 82 may extend to define a space therebetween that may include insulation material or the like within the space between the inner and outer panels 80, 82.

The lower cooking portion 14 and the smoker chamber 20 may be separated by a horizontally suspended panel or smoke shield 84 to define an upper smoker portion 86 (or upper region) and a lower smoker portion 88 (or lower region) of the smoker chamber 20. Such smoke shield 84 may sit over brackets or the like for suspending the smoke shield 84 horizontally along a mid-portion of the smoke chamber 20. Further, the smoke shield 84 may define an aperture 90 or smoke opening therein that may be off-set relative to the second heating element 26 positioned in the lower smoker portion 88, the aperture 90 including a screen or grate like structure so as to minimize ash from passing through the aperture 90, but also facilitate smoke for passing through the screen and aperture 90 defined in the smoke shield 84. The aperture 90 may be defined with bowed structure 92 extending slightly downward in a bowing manner from the remaining structure of the smoke shield 84. Further, the upper smoker portion 86 of the smoke chamber 20 may include a smoke outlet 96 defined in a vertically extending rear panel 98 of the lower cooking portion 14 such that the smoke outlet 96 may be positioned along the rear panel 98 within an upper portion of the upper smoker portion 86. In one embodiment, the smoke outlet 96 may include moveable structure to facilitate minimizing and enlarging the size of the smoke outlet 96, such as a slideable plate that may be pivotably moveable or linearly moveable over the smoke outlet 96.

The upper smoker portion 86 of the lower cooking portion 14 or smoke chamber 20 may include the second cooking surface 24 or grate like structure that may be suspended by brackets or a ledge within the upper smoker portion 86 and above the smoke shield 84. In another embodiment, the second cooking surface 24 may be in the form of hooks for suspending food in the smoke chamber 20 and may be included additionally to the grate like structure. Such second cooking surface 24 and upper smoker portion 86 may be accessible from the front side 36 of the lower cooking portion 14 with the door 22. Such door 22 may be pivotably coupled to the front side 36 of the main body 30 along a bottom end of the door 22 with, for example, hinge components positioned adjacent bottom corners of the door 22. In this manner, the door 22 may be pivotably coupled so as to be movable between an open position and a closed position. With the door 22 in the open position, the upper smoke portion may be accessible for placing and removing food positioned on the second cooking surface 24. Further, in the open position, the second cooking surface 24 and the smoke shield 84 may be removed from the upper smoker portion 86 for cleaning purposes and for accessing the lower smoker portion 88.

With the door 22 in the closed position, the lower cooking portion 14 and the smoke chamber 20 may be sized and configured to hold heated smoke therein so as to slowly cook food positioned on the second cooking surface 24 or grate. In one embodiment, the door 22 may be spring biased to the closed position. The door 22, such as along an inner peripheral surface 94 of the door 22, may sit against the main body 30 such that a resilient material (not shown) disposed between the inner peripheral surface 94 and the main body 30 may substantially seal the door 22 in the closed position. In this manner, heated smoke may be maintained in the smoke chamber 20 so that smoke leaking from the smoke chamber 20 is minimal except though the smoke outlet 96 defined in the main body 30, such as in the rear panel 98 of the lower cooking portion 14. The user may control the amount of smoke escaping through the smoke outlet 96 by modifying the size of the smoke outlet 96, as previously set forth.

Figure 5:
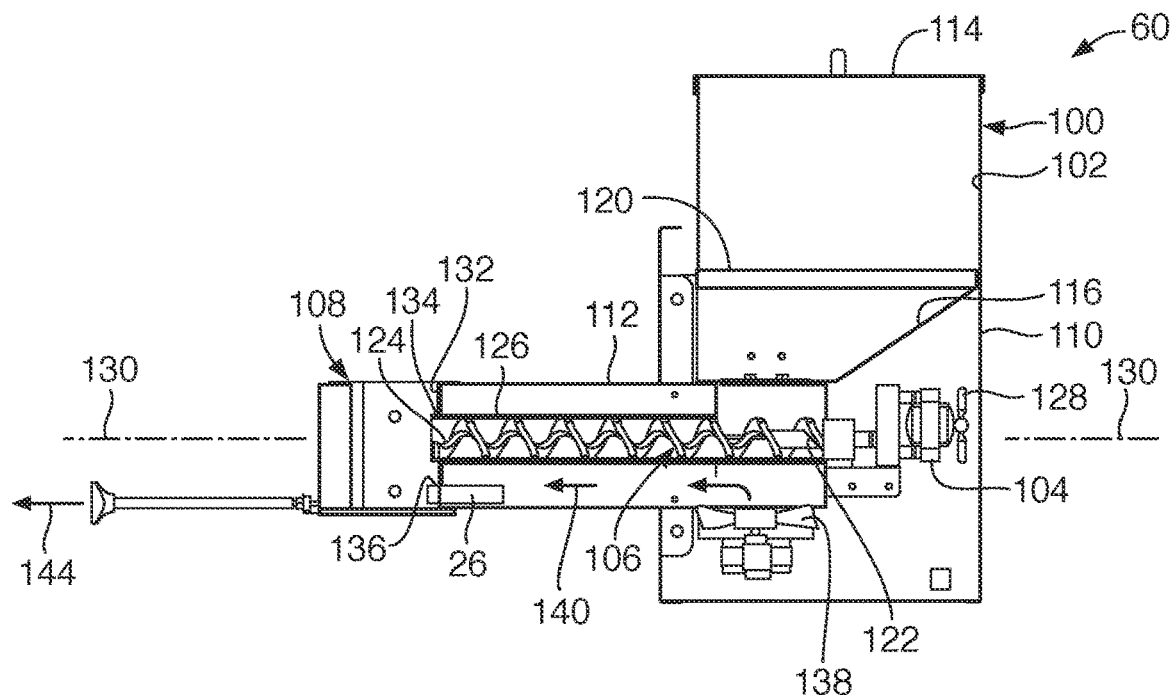
FIG. 5 is an enlarged front cross-sectional view of a pellet feeder system, according to another embodiment of the present invention.

Now with reference to FIGS. 3, 4, and 5, as previously set forth, the pellet feeder system 60 may be attached to the lower portion 62 of the main body 30 along the second side 46 of the main body 30. In one embodiment, the pellet feeder system 60 may be at least partially positioned below the second side shelf 52 of the cooking station 10. The pellet feeder system 60 may be sized and configured to feed pellets to the second heating element 26 for generating heated smoke to the smoke chamber 20. Such pellet feeder system 60 may include a housing 100, a pellet hopper 102, a motor 104, an auger 106, and the second heating element 26, each of which cooperate together to feed pellets to a pellet cup 108 coupled to and/or supporting the second heating element 26. The housing 100 of the pellet feeder system 60 may define an upright extending portion 110 and a laterally extending portion 112, the upright extending portion 110 having a generally cubical external shape with the lateral portion 112 extending from the upright portion 110 and into the lower smoker portion 88. The upright extending portion 110 of the housing 100 may hold the pellet hopper 102, the motor 104 and a portion of the auger 106. The upright extending portion 110 of the housing 100 may include a lid 114 at a top end of the housing 100 that may be pivotably coupled to the top end so that the inside of the pellet hopper 102 may be accessed to pour pellets therein. The laterally extending portion 112 of the housing 100 may hold the remaining portion of the auger 106 and may extend laterally from a lower portion of the upright extending portion 110 of the housing 100.

The pellet hopper 102 may be defined at least partially by the housing 100 of the upright extending portion 110. For example, the pellet hopper 102 may be defined by a hopper floor 116 and an upper portion of the upright extending portion 110 of the housing 100. The pellet hopper 102 may be sized and configured to hold pellets (not shown) therein and to funnel the pellets to an auger entry portion 118. As such, the hopper floor 116 may be oriented at an angled position so that the pellets may funnel toward the auger entry portion 118 of the pellet hopper 102. Further, the pellet hopper 102 may include a screen 120 or grate structure therein to screen clumped pellets from moving to the auger entry portion 118 of the pellet hopper 102. The auger 106 may extend horizontally with a helical configuration between a first end 122 and a second end 124 such that the auger 106 extends through a tube 126. The first end 122 of the auger 106 may be coupled to the motor 104 to facilitate rotation of the auger 106, as known to one skilled in the art. The motor 104 may be an electrically driven motor with a first fan 128 positioned adjacent thereto to assist in cooling the motor 104. As the motor 104 rotates the auger 106 about an auger axis 130 thereof, the auger 106 may feed pellets through the tube 126 and into the pellet cup 108. In this manner, the end of the tube 126 and second end 124 of the auger 106 may be positioned adjacent an upright wall 132 of the pellet cup 108.

The pellet cup 108 may include the upright wall 132 with an upper hole 134 and a lower hole 136 each defined in the upright wall 132, the upper hole 134 positioned directly above the lower hole 136 of the pellet cup 108. The pellet cup 108 may support the tube 126 such that the end of the tube 126 and second end 124 of the auger 106 may be positioned slightly through the upper hole 134 of the pellet cup 108. The lower hole 136 of the pellet cup 108 may hold the second heating element 26 such that the second heating element 26 extends through the lower hole 136 and may be disposed below the end of the tube 126. The second heating element 26 may be electrically heated, as known to one of ordinary skill in the art, so as to burn the pellets feeding in the pellet cup 108 to generate heated smoke. The pellet feeder system 60 may also include a second fan 138. The second fan 138 may be employed to provide air flow, as shown by arrow 140, to the burning pellets so that the burning pellets may be fueled to burn hotter in the pellet cup 108. The second fan 138 may be positioned below the laterally extending portion 112 and within the upright extending portion 110 of the housing 100. The pellet cup 108 may include appropriate venting to facilitate the air flow to the pellets within the pellet cup 108. With this arrangement, the second heating element 26 may burn pellets being fed within the pellet cup 108 and air flow may fan the burning pellets to increase the heat produced by the burning pellets.

Further, the pellet cup 108 may be removed or partially removed from an end of the laterally extending portion 112 of the housing 100 so that ash built-up in the pellet cup 108 may be removed. For example, the pellet cup 108 may be removed by pulling on a slideable rod 142 extending from the pellet cup 108, as shown by arrow 144. Such rod 142 may also be rotatable and slidable in order to decouple the pellet cup 108 (or a portion thereof) from the housing 100. In this manner, as ash is formed from burning the pellets with the second heating element 26, a user may access the lower smoker portion 88 of the smoker chamber 20, decouple the pellet cup 108 and discard the ash therein. The user may then re-attach the pellet cup 108 in its appropriate position in the smoker chamber 20.

Figure 6:
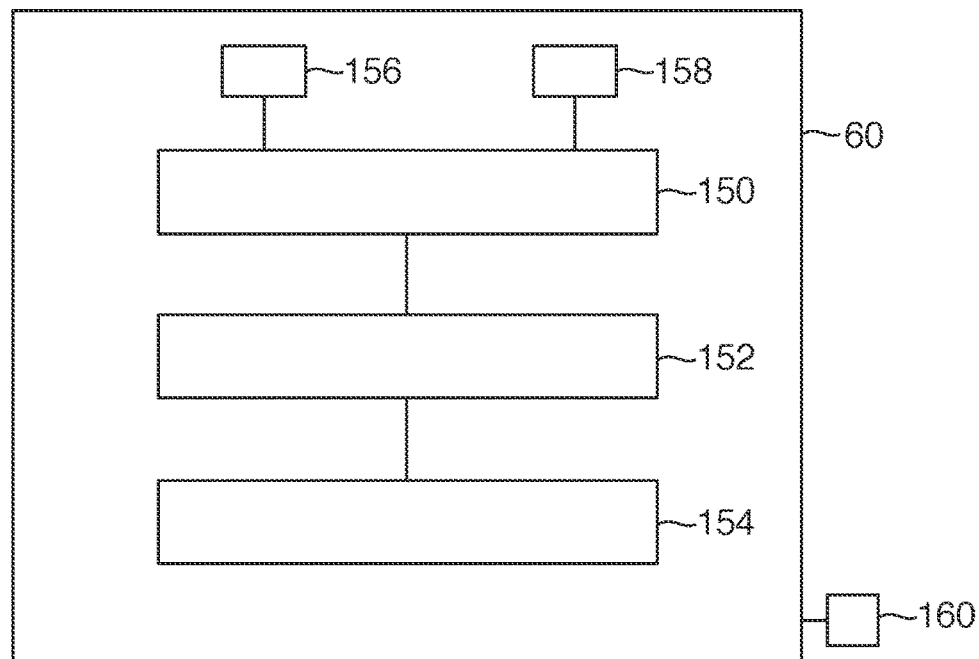
FIG. 6 is a schematic view of a control system associated with the cooking station of FIG. 1, according to another embodiment of the present invention.

In another embodiment, with reference to FIGS. 1, 4 and 6, the pellet feeder system 60 may include a control panel 150 positioned on, for example, the front side 36 of the housing 100 of the pellet feeder system 60. The control panel 150 may be coupled to a controller 152 and a temperature sensor 154. The control panel 150 may include input controls 156, such as input buttons, and an output 158, such as a display. Further, the pellet feeder system may be coupled to a power connection 160 for electrically powering the components coupled to the control panel 150 as well as the other components of the pellet feeder system 60, as known to one of ordinary skill in the art. The controller 152 may be sized and configured to control components of the pellet feeder system 60, such as the motor 104, the second heating element 26, and the first and second fans 128, 138. The temperature sensor 154 may be positioned within or adjacent the inner panel 80 of the upper smoker portion 86 and may be sized and configured to sense an actual temperature of the upper smoker portion 86, such that the actual temperature may be viewable on the display of the control panel 150. With this arrangement, a user of the lower cooking portion 14 of the cooking station 10 may employ the input controls 156 to input a period of time for cooking the food product in the smoker chamber 20 as well as input a desired temperature for maintaining the smoker chamber 20 of the cooking station 10 over the period of time. The controller 152 in cooperation with the temperature sensor 154 may control activation and deactivation of the motor 104 for supplying pellets via the auger 106 into the pellet cup 108 as well as activate and deactivate heating the second heating element 26 to burn the pellets to generate heated smoke. The controller 152 may also control running the second fan 138 to provide air flow to the pellet cup 108 with the burning pellets to assist in the pellets burning hotter to generate additional heated smoke. Further, the controller 152 may control the first fan 128 to assist in cooling the motor 104.

Upon the actual temperature of the smoker chamber 20 meeting the desired temperature previously set with the input controls 156, as sensed by the temperature sensor 154, the controller 152 may maintain the actual temperature to about the desired temperature in the smoker chamber 20 by activating the motor 104, the second fan 138, and/or the second heating element 26, as needed. In this manner, the actual temperature of the smoker chamber 20 may be maintained to approximately the desired temperature for the period of time set with the input controls 156 on the control panel 150. Further, in another embodiment, the input and output controls may be controlled and viewed remotely with application software via the Internet from a user's mobile phone. Such remote control may be advantageous due to the long period of time required to cook food through heated smoke in the smoker chamber 20.

At any time, such as while cooking food in the smoker chamber 20, a user may cook other food with the gas fueled first heating element 16 (FIG. 2) on the first cooking surface 18, such as on the griddle member 70 or on a grill structure, as previously set forth. As such, the cooking station 10 provides a single portable compact unit that may be employed to cook food in different cooking modes, one cooking mode being gas fueled and the other cooking mode being electrically activated to burn pellets for generating heated smoke. In this manner, a user of the cooking station 10 can slowly cook food in the smoker chamber 20 over a long period of time to obtain the desired smoked flavor in the food while also being able to employ another cooking mode with the cooking station 10, independent of the smoker chamber 20, to cook over gas fueled burners to heat the griddle member 70 of the cooking station 10.

Figure 7:
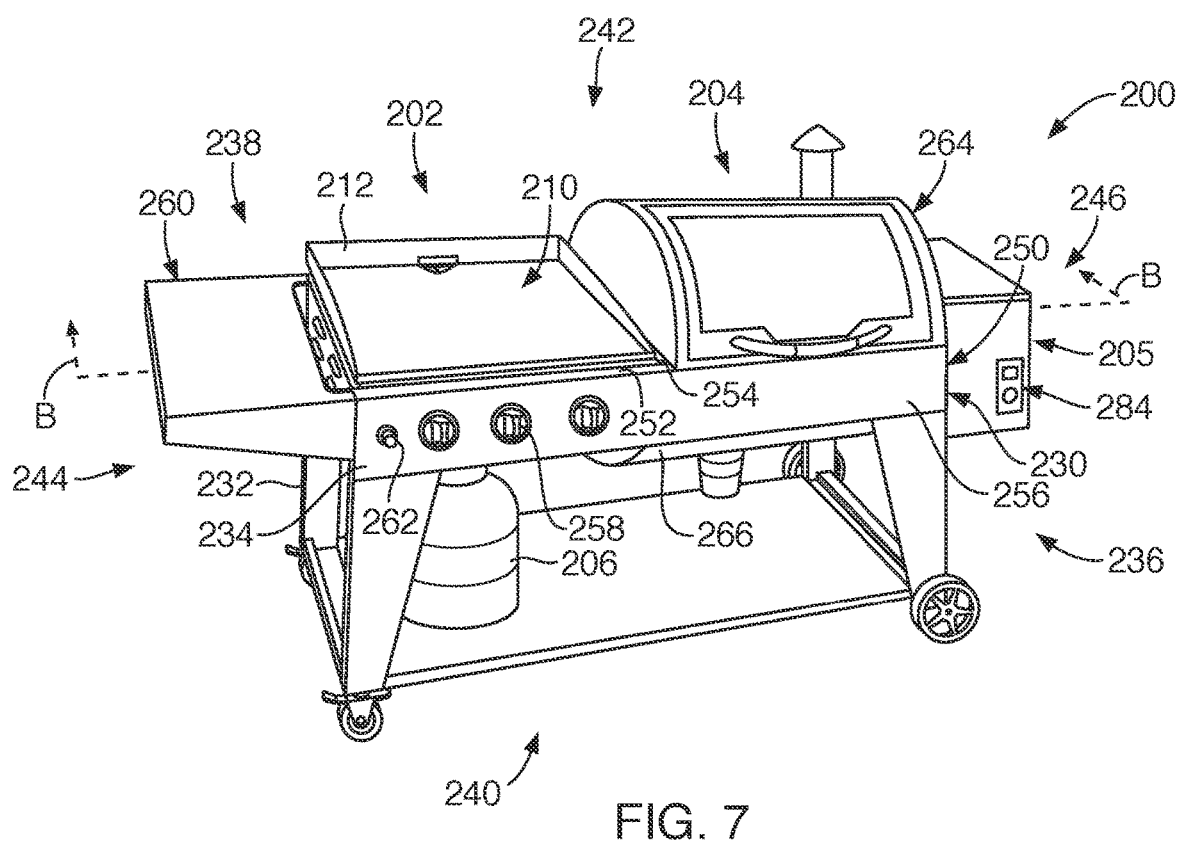
FIG. 7 is a perspective front view of another embodiment of an outdoor cooking station, depicting a first cooking portion and a second cooking portion in a side-by-side arrangement, according to the present invention.
Figure 8:
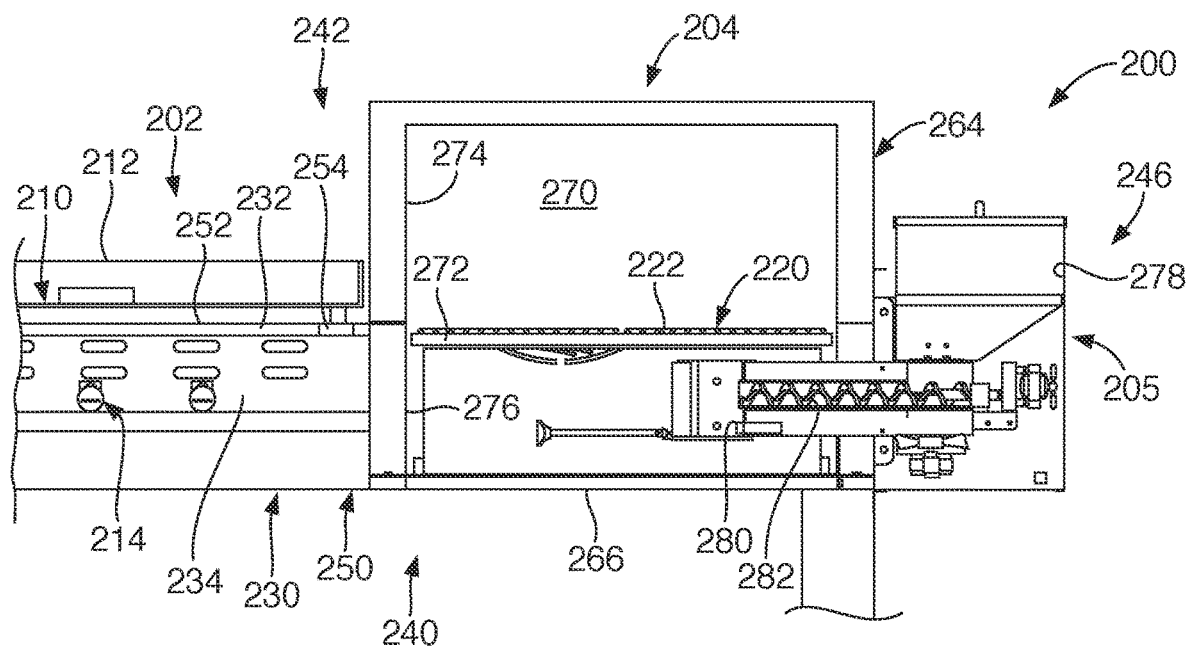
FIG. 8 is a partial cross-sectional view of the first and second cooking portions of the cooking station taken along section line B-B of FIG. 7, according to another embodiment of the present invention.

With reference to FIGS. 7 and 8, another embodiment of a cooking station 200 with duel cooking modes is provided. In this embodiment, the cooking station 200 may include similar functionality as the previous embodiment, except instead of the cooking station having the duel cooking modes in a stacked arrangement, the duel cooking modes may be in a side-by-side arrangement within a stand-alone portable cooking unit. For example, the cooking station 200 may include a first cooking portion 202 and a second cooking portion 204 each with separate first and second fuel sources. The first fuel source may be fueled with gas from, a propane tank 206, or natural gas fed via gas lines, for example. The second fuel source may be a pellet feeder system 205, electrically heating/burning pellets (not shown) to create heated smoke. As such, the first cooking portion 202 may include a first cooking surface 210, such as a griddle member 212, which may be heated via first heating elements 214 fueled by the first fuel source, similar to that described and depicted for the upper cooking portion 12 of the cooking station 10 of FIGS. 1 and 2. The second cooking portion 204 may include a second cooking surface 220, such as a grill 222 or hooks, similar to the second cooking surface 24 described and depicted in FIG. 2. Further, the pellet feeder system 205 cooperating with the second cooking portion 204 of this embodiment may include the same components of the pellet feeder system 60 described and depicted relative to FIGS. 3-6.

The cooking station 200 of this embodiment may include a main body 230 extending with frame components 232 and panels 234 to define a front side 236, a rear side 238, a bottom side 240, a top side 242, a first side 244 and a second side 246. The front side 236 may be oppositely positioned relative to the rear side 238. The bottom side 240 may be opposite the top side 242. Similarly, the first side 244 may be opposite relative to the second side 246. The main body 230 of the cooking station 200 may include an upper portion 250, the upper portion 250 including the first and second cooking portions 202, 204 therein. The upper portion 250 defining an upper edge 252 extending along each of the above described front and rear sides 236, 238 and first and second sides 244, 246 to define a rectangular periphery of the main body 230 along the upper edge 252. The upper edge 252 may also define a cross-member 254 that may extend between the front side 236 and the rear side 238 of the upper edge 252, the cross-member 254 defining a separation between the first and second cooking portions 202, 204 of the main body 230. The cross-member 254 may extend between the front and rear sides 236, 238 of the upper edge 252 at about a mid-point therealong so that the first and second cooking portions 202, 204 may exhibit substantially equal cooking spaces or regions of the cooking station 200. The griddle member 212 may be positioned along the upper edge 252 adjacent the first side 244 and partial substantially equal portions of the upper edge 252 along the front and rear sides 236, 238 as well as on the cross-member 254. Further, the first cooking portion 202 may include burner valves 258 or knobs along a front panel 256 positioned along the front side 236 of the upper portion 250 of the main body 230. Each burner valve 258 may be associated with one of the first heating elements 214, similar to the first heating elements 16 of FIG. 2. The front panel 256 may also include an igniter switch 262 for igniting the first heating elements 214 for heating the griddle member 212. Further, the main body 230 may include a single side shelf 260 positioned adjacent the griddle member 212 along the first side 236 of the main body 230. Such side shelf 260 may include various features, such as an elongated opening and ridge arrangement, to discourage users from placing various cooking items or tools too close to the griddle member 212, similar to that disclosed in commonly owned U.S. patent application Ser. No. 16/364,012, filed Mar. 25, 2019, entitled "OUTDOOR COOKING STATION, SIDE SHELF, AND METHOD THEREOF," the disclosure of which is incorporated herein by reference in its entirety.

As previously set forth, the upper portion 250 of the main body 230 may also support the second cooking portion 204 of the cooking station 200. The second cooking portion 204 may include a pivoting lid 264 that may pivot about a hinge (not shown) along the rear side of the main body 230. Further, the second cooking portion 204 may define an underside panel 266 that may extend below or lower than the front panel 256 or be substantially level with a lower edge of the front panel 256, which may extend along an underside of the upper portion 250 between the cross-member 254 and the second side 246 of the main body 230 and the front and rear sides 236, 238 of the main body 230. In one embodiment, the underside panel 266 of the second cooking portion 204 may be in the form of a barrel belly type structure. The underside panel 266 and the pivoting lid 264 of the second cooking portion 204 may define a smoker chamber 270 that may be accessible by moving the pivoting lid 264 to an open position.

The smoker chamber 270 may include a smoke shield 272 therein, positioned horizontally on brackets, for example, so as to divide the smoker chamber 270 between an upper smoker region 274 and a lower smoker region 276, similar to the previous embodiment. Further, the upper smoker region 274 may include the grill 222 or grate like structure positioned just above the smoke shield 272, the grill 222 extending to define the second cooking surface 220 of the cooking station 200. The upper smoker region 274 may additionally include hooks for hanging food to be cooked within the upper smoker region 274. In one embodiment, the grill 222 or second cooking surface 220 may be positioned horizontally to be substantially level with the first cooking surface 210, such as the griddle member 212. In another embodiment, the grill 222 or second cooking surface 220 may be positioned lower within the smoker chamber 270 such that the grill 222 may be positioned at a level that is lower than the first cooking surface 210. As in the previous embodiment, the second cooking portion 204 may be heated with the pellet feeder system 205, which may include similar structural components as the pellet feeder system 60 cooperating with the lower cooking portion 14 described and depicted relative to FIGS. 4-6. For example, the pellet feeder system 205 may include a pellet hopper 278 for feeding pellets to a second heating element 280 with a motorized auger 280 and controlled from a control panel 284. As such, the pellet feeder system 205 of this embodiment may function in the same manner and include the same structural components as described in the previous embodiment relative to FIGS. 4-6. In this manner, similar to the previous embodiment, the cooking station 200 may operate with separate cooking modes and from separate fuel sources for heating the first and second cooking portions 202, 204 independently and simultaneously all within a stand-alone portable cooking station 200 designed for the outdoors.

The various structural components of the various embodiments of the main body of the cooking station and the pellet feeder system and any other structural components thereof may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station configured to independently cook food with different cooking modes, one of the cooking modes configured to burn pellet elements to produce heated smoke, the outdoor cooking station comprising:
    a main body extending to define a first cooking portion and a second cooking portion for cooking in the different cooking modes, the first cooking portion and the second cooking portion being separate so as to be configured to be dedicated to cooking food simultaneously and independent of each other with the different cooking modes, the first cooking portion including a gas burner heating element positioned below an upper edge of the main body, the gas burner heating element positioned to heat a flat cooking surface associated with the first cooking portion of the main body, the second cooking portion of the main body extending to define a chamber, the chamber being accessible with an access member pivotably coupled to the main body, the chamber including an upper region and a lower region separated by an inner panel, the upper region including a grill cooking surface suspended within the upper region such that the access member is positioned to access the grill cooking surface within the chamber, the flat cooking surface being external to the chamber, the lower region including an electrical heating element sized and configured to electrically burn the pellet elements to supply the heated smoke to the upper region of the second cooking portion within the chamber; and
    a pellet feeder system coupled to the main body, the pellet feeder system including a hopper and a feeder, the hopper defining an opening adjacent a lower end of the hopper and the hopper configured to hold the pellet elements, the feeder positioned adjacent the opening defined in the hopper such that the feeder is configured to rotate so as to deliver the pellet elements from the opening defined in the hopper to the lower region of the chamber and adjacent the electrical heating element of the second cooking portion.

2. The outdoor cooking station of claim 1, wherein the flat cooking surface extends to define a griddle member, the griddle member supported by the upper edge of the main body.

3. The outdoor cooking station of claim 1, wherein the main body extends vertically to define a central axis extending centrally and vertically through the main body, the central axis extending through the flat cooking surface and the grill cooking surface.

4. The outdoor cooking station of claim 1, wherein the main body defines a smoke outlet in a vertically extending panel of the main body that at least partially surrounds the chamber of the second cooking portion.

5. The outdoor cooking station of claim 1, wherein the inner panel defines a smoke opening therein, the inner panel being removable from the chamber.

6. The outdoor cooking station of claim 1, wherein the grill cooking surface extends to define a rack, the rack extending substantially parallel relative to the griddle cooking surface.

7. The outdoor cooking station of claim 1, further comprising a temperature sensor and a controller, the temperature sensor associated with the chamber and configured to sense a temperature of the chamber, the controller operably coupled to the temperature sensor and the pellet feeder system and configured to control an amount of the pellet elements being fed to the electrical heating element to control the temperature of the chamber.

8. The outdoor cooking station of claim 1, wherein the main body extends with frame components and panels each extending to define the first cooking portion and the second cooking portion between the upper edge and a bottom end of the main body, the panels extending to define the chamber directly below the gas burner heating element.

9. The outdoor cooking station of claim 1, wherein the main body extends vertically between the upper edge and a bottom end of the main body, the bottom end including wheels extending adjacent therefrom to facilitate portability of the main body.

10. The outdoor cooking station of claim 1, wherein the first and second cooking portions are supported by the main body so as to be positioned laterally relative to each other in a side-by-side arrangement.

11. A method for cooking food in the outdoors, the method comprising:
    providing an outdoor cooking station with a main body extending to define a first cooking portion and a second cooking portion, the first cooking portion and the second cooking portion being separate so as to be dedicated to cooking food simultaneously and independent of each other with different cooking modes, the first cooking portion including a gas burner heating element for heating a flat cooking surface positioned adjacent an upper edge of the main body, the second cooking portion defining a chamber configured to hold heat therein and accessible with an access member pivotably coupled to the main body, the second cooking portion separated by a removable inner panel to define an upper region and a lower region of the chamber, the main body including a pellet feeder system coupled thereto, the pellet feeder system including a hopper and a feeder, the hopper sized and configured to hold pellet elements therein and to be moved therefrom by the feeder;
    opening the access member to position food on a grill cooking surface suspended within the upper region of the second cooking portion and then closing the access member to enclose the food within the chamber of the second cooking portion, the flat cooking surface being external to the chamber;
    feeding the pellet elements from an opening defined in a lower end of the hopper with rotation of the feeder to deliver the pellet elements to the lower region of the chamber of the second cooking portion and adjacent an electrical heating element;
    heating the chamber by burning the pellet elements with the electrical heating element to generate smoke so that heated smoke moves from the lower region and through a smoke opening defined in the inner panel to fill the upper region to heat the food on the grill cooking surface such that the heated smoke is configured to only cook food positioned within the chamber with the grill cooking surface; and heating the flat cooking surface with the gas burner heating element for cooking other food on the flat cooking surface simultaneously while cooking food on the grill cooking surface such that heat from the gas burner heating element is configured to only cook food positioned on the flat cooking surface.

12. The method according to claim 11, wherein the providing comprises providing the flat cooking surface to define a griddle member configured to be supported by the upper edge of the main body above the flame burner heating element such that the flat cooking surface, in a use state, is substantially parallel relative to the grill cooking surface.

13. The method according to claim 11, wherein the heating the chamber comprises feeding the pellet elements to a pellet cup in the lower region with the pellet feeder system positioned adjacent the main body of the cooking station and extending partially within the lower region such that the electrical heating element extends into a bottom portion of the pellet cup.

14. The method according to claim 11, wherein the feeding the pellet elements comprises controlling the amount of pellets for feeding to the electrical heating element with a controller and heat sensor, the heat sensor associated with the chamber of the second cooking portion.

15. The method according to claim 11, wherein the providing comprises providing the first cooking portion to be positioned laterally relative to the second cooking portion.

16. An outdoor cooking station configured to independently cook food with different cooking modes and with separate fuel sources, one of the cooking modes configured to burn pellet elements to produce heated smoke, the outdoor cooking station comprising:

a first cooking portion and a second cooking portion for cooking in the different cooking modes, the first cooking portion and the second cooking portion being separate so as to be configured to be dedicated to cooking food simultaneously and independent of each other with the different cooking modes, the first cooking portion and the second cooking portion extending with frame components and coupled together with the frame components, the first cooking portion including a gas burner heating element supported by the frame components and positioned below an upper edge of the first cooking portion, the gas burner heating element configured to heat a flat cooking surface associated with the first cooking portion and positioned over the upper edge of the first cooking portion, the second cooking portion extending to define a smoker chamber, the smoker chamber being accessible with an access member pivotably coupled to the second cooking portion, the smoker chamber including an upper smoker region and a lower smoker region separated by an inner panel, the upper smoker region including a grill cooking surface suspended within the upper smoker region such that the access member is positioned to access the grill cooking surface within the smoker chamber, the flat cooking surface being external to the smoker chamber, the lower smoker region including an electrical heating element sized and configured to electrically burn the pellet elements to supply the heated smoke to the upper smoker region of the second cooking portion within the chamber; and a pellet feeder system coupled to the frame components of the second cooking portion, the pellet feeder system including a hopper and a feeder, the hopper defining an opening adjacent a lower end of the hopper, the hopper sized and configured to hold the pellet elements, the feeder positioned adjacent the opening defined in the hopper such that the feeder is configured to rotate so as to deliver the pellet elements from the opening defined in the hopper to the lower smoker region of the smoker chamber and adjacent the electrical heating element of the second cooking portion.

17. The outdoor cooking station of claim 16, wherein the flat cooking surface extends to define a griddle member, the griddle member supported by the frame components.

18. The outdoor cooking station of claim 16, further comprising a temperature sensor and a controller, the temperature sensor associated with the smoker chamber and configured to sense a temperature of the smoker chamber, the controller operably coupled to the temperature sensor and the pellet feeder system and configured to control an amount of the pellet elements being fed to the electrical heating element to control the temperature of the smoker chamber.

19. The outdoor cooking station of claim 16, wherein the first cooking portion is positioned directly above the second cooking portion.

20. The outdoor cooking station of claim 16, wherein the first and second cooking portions are supported by the frame components so as to be positioned laterally relative to each other in a side-by-side arrangement.

21. The outdoor cooking station of claim 16, wherein the inner panel defines a smoke opening therein, the inner panel being removable from the chamber, and the smoke opening configured to facilitate smoke to move from the lower smoker region to the upper smoker region of the smoker chamber.

22. The outdoor cooking station of claim 16, wherein the smoker chamber is at least partially defined with one or more panels, the smoker chamber including a smoke outlet defined in one of the panels to facilitate releasing smoke from the smoker chamber of the second cooking portion.

23. The outdoor cooking station of claim 16, wherein the access member extends as a pivoting lid to at least partially define the smoker chamber.

24. The outdoor cooking station of claim 16, wherein the access member extends as a pivoting door to at least partially define the smoker chamber.

* * * * *